United States Patent
Krishnaswamy

(10) Patent No.: US 9,392,445 B2
(45) Date of Patent: Jul. 12, 2016

(54) HANDOFF AT AN AD-HOC MOBILE SERVICE PROVIDER

(75) Inventor: Dilip Krishnaswamy, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 937 days.

(21) Appl. No.: 12/188,990

(22) Filed: Aug. 8, 2008

(65) Prior Publication Data

US 2009/0046658 A1 Feb. 19, 2009

Related U.S. Application Data

(60) Provisional application No. 60/956,658, filed on Aug. 17, 2007, provisional application No. 60/980,557, filed on Oct. 17, 2007.

(51) Int. Cl.
| | |
|---|---|
| *H04W 36/00* | (2009.01) |
| *H04W 12/04* | (2009.01) |
| *H04W 12/06* | (2009.01) |
| *H04W 84/18* | (2009.01) |

(52) U.S. Cl.
CPC .......... *H04W 12/04* (2013.01); *H04W 36/0038* (2013.01); *H04W 12/06* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 5,263,121 A | 11/1993 | Melsa et al. | |
| 5,301,359 A | 4/1994 | Van Den Heuvel et al. | |
| 5,999,813 A | 12/1999 | Lu et al. | |
| 6,125,185 A | 9/2000 | Boesch | |
| 6,240,073 B1 | 5/2001 | Reichman et al. | |
| 6,275,712 B1 | 8/2001 | Gray et al. | |
| 6,295,453 B1 | 9/2001 | Desgagne et al. | |
| 6,377,805 B1 | 4/2002 | Anvekar et al. | |
| 6,650,900 B1 | 11/2003 | Chavez, Jr. et al. | |
| 6,735,417 B2 | 5/2004 | Fonseca, Jr. et al. | |
| 6,788,656 B1 | 9/2004 | Smolentzov et al. | |
| 6,871,071 B2 | 3/2005 | Takao et al. | |
| 6,879,574 B2 | 4/2005 | Naghian et al. | |

(Continued)

FOREIGN PATENT DOCUMENTS

| | | |
|---|---|---|
| CN | 1342377 A | 3/2002 |
| CN | 1360795 A | 7/2002 |

(Continued)

OTHER PUBLICATIONS

Dilip Krishnaswamy: "AWiMA: An Architecture for Adhoc Wireless Mobile Internet Access" Global Telecommunications Conference, 2008. IEEE Globecom 2008., Nov. 30, 2008, pp. 1-5, XP031370766 IEEE, Piscataway, NJ, USA ISBN: 978-1-4244-2324-8 abstract; figure 1 p. 2, col. 1, paragraph 3-p. 3, col. 2, paragraph 3.3.2; figure 2.
European Search Report—EP08006299, European Search Authority—Berlin—Mar. 11, 2009.
European Search Report—EP08006403, European Search Authority—The Hague—Jan. 27, 2009.

(Continued)

*Primary Examiner* — Alex Skripnikov
(74) *Attorney, Agent, or Firm* — Howard Seo

(57) ABSTRACT

An ad-hoc service provider is configured to support pre-authentication with a server for the purpose of receiving a handoff of a mobile client from another ad-hoc service provider. The ad-hoc service provider is further configured to enable the mobile client to maintain a session with the server while receiving the handoff from said another ad-hoc service provider.

51 Claims, 5 Drawing Sheets

(56) References Cited

U.S. PATENT DOCUMENTS

| | | |
|---|---|---|
| 6,961,575 B2 | 11/2005 | Stanforth |
| 6,970,422 B1 | 11/2005 | Ho et al. |
| 7,003,117 B2 | 2/2006 | Kacker et al. |
| 7,046,647 B2 * | 5/2006 | Oba et al. ............... 370/331 |
| 7,089,417 B2 | 8/2006 | Wack et al. |
| 7,110,372 B2 | 9/2006 | Kovacs et al. |
| 7,123,908 B2 | 10/2006 | Chandler |
| 7,155,518 B2 | 12/2006 | Forslow |
| 7,161,914 B2 | 1/2007 | Shoaib et al. |
| 7,170,878 B2 | 1/2007 | Fukuda |
| 7,254,119 B2 * | 8/2007 | Jiang et al. ............... 370/328 |
| 7,266,374 B2 | 9/2007 | Kim |
| 7,266,383 B2 | 9/2007 | Anderson |
| 7,295,532 B2 | 11/2007 | Haller et al. |
| 7,313,363 B2 | 12/2007 | Davis et al. |
| 7,339,915 B2 | 3/2008 | Jakkahalli et al. |
| 7,340,253 B2 | 3/2008 | LaPorta |
| 7,346,167 B2 | 3/2008 | Billhartz et al. |
| 7,349,370 B2 | 3/2008 | Lee et al. |
| 7,362,731 B2 | 4/2008 | Vinayakray-Jani |
| 7,363,050 B2 | 4/2008 | Nakano |
| 7,394,826 B2 | 7/2008 | Cain et al. |
| 7,408,929 B2 | 8/2008 | Adachi et al. |
| 7,420,952 B2 | 9/2008 | Da Costa et al. |
| 7,444,152 B2 | 10/2008 | Wu et al. |
| 7,486,651 B2 | 2/2009 | Hagiwara et al. |
| 7,496,363 B2 | 2/2009 | Salkintzis |
| 7,519,071 B2 | 4/2009 | Thubert et al. |
| 7,551,576 B2 | 6/2009 | Ahmavaara |
| 7,552,234 B2 * | 6/2009 | Thubert et al. ............... 709/238 |
| 7,573,904 B2 | 8/2009 | Pichna et al. |
| 7,577,108 B2 | 8/2009 | Zhang et al. |
| 7,593,378 B1 | 9/2009 | Murali et al. |
| 7,624,267 B2 * | 11/2009 | Huang et al. ............... 713/168 |
| 7,649,872 B2 | 1/2010 | Naghian et al. |
| 7,664,049 B1 | 2/2010 | Arrakoski et al. |
| 7,680,079 B2 | 3/2010 | Jeong et al. |
| 7,756,082 B1 | 7/2010 | Dhamdhere |
| 7,757,076 B2 | 7/2010 | Stewart et al. |
| 7,881,474 B2 * | 2/2011 | Sun ............... 380/270 |
| 7,903,817 B2 * | 3/2011 | Cam-Winget et al. ........ 380/270 |
| 7,929,460 B2 | 4/2011 | Chen et al. |
| 7,933,247 B2 | 4/2011 | Gidwani |
| 8,014,368 B2 | 9/2011 | Kim et al. |
| 8,295,225 B2 | 10/2012 | Ji et al. |
| 8,406,399 B2 | 3/2013 | Loveland |
| 8,717,931 B2 | 5/2014 | Kenichi et al. |
| 2001/0012757 A1 | 8/2001 | Boyle |
| 2001/0024443 A1 | 9/2001 | Alriksson et al. |
| 2002/0039367 A1 | 4/2002 | Seppala et al. |
| 2002/0061750 A1 | 5/2002 | Mohebbi |
| 2002/0080738 A1 * | 6/2002 | Kim et al. ............... 370/331 |
| 2002/0138635 A1 | 9/2002 | Redlich et al. |
| 2002/0181447 A1 | 12/2002 | Hashizume et al. |
| 2002/0198019 A1 | 12/2002 | Naim et al. |
| 2003/0054796 A1 | 3/2003 | Tamaki et al. |
| 2003/0068975 A1 | 4/2003 | Qiao et al. |
| 2003/0087646 A1 | 5/2003 | Funato et al. |
| 2003/0092444 A1 | 5/2003 | Sengodan et al. |
| 2003/0095504 A1 | 5/2003 | Ogier |
| 2003/0101263 A1 | 5/2003 | Bouillet et al. |
| 2003/0103496 A1 | 6/2003 | Lakshmi et al. |
| 2003/0103521 A1 | 6/2003 | Raphaeli et al. |
| 2003/0123404 A1 | 7/2003 | Kasapi et al. |
| 2003/0157951 A1 * | 8/2003 | Hasty, Jr. ............... 455/519 |
| 2003/0169697 A1 | 9/2003 | Suzuki et al. |
| 2003/0198346 A1 | 10/2003 | Meifu et al. |
| 2003/0202476 A1 | 10/2003 | Billhartz et al. |
| 2003/0203741 A1 | 10/2003 | Matsuo et al. |
| 2003/0212802 A1 | 11/2003 | Rector et al. |
| 2003/0235174 A1 | 12/2003 | Pichna et al. |
| 2004/0001442 A1 | 1/2004 | Rayment et al. |
| 2004/0008663 A1 | 1/2004 | Srikrishna et al. |
| 2004/0029528 A1 | 2/2004 | Chandler |
| 2004/0068668 A1 | 4/2004 | Lor et al. |
| 2004/0087268 A1 | 5/2004 | Hatano |
| 2004/0171386 A1 | 9/2004 | Mitjana |
| 2004/0174822 A1 | 9/2004 | Bui |
| 2004/0202120 A1 | 10/2004 | Hanson |
| 2004/0203787 A1 | 10/2004 | Naghian |
| 2004/0235452 A1 | 11/2004 | Fischer et al. |
| 2004/0235481 A1 | 11/2004 | Shimizu |
| 2004/0266439 A1 | 12/2004 | Lynch, Jr. et al. |
| 2005/0053005 A1 | 3/2005 | Cain et al. |
| 2005/0058109 A1 | 3/2005 | Ekberg |
| 2005/0063359 A1 | 3/2005 | Jagadeesan et al. |
| 2005/0088980 A1 | 4/2005 | Olkkonen et al. |
| 2005/0094588 A1 | 5/2005 | Wentink |
| 2005/0108527 A1 | 5/2005 | Ginzburg et al. |
| 2005/0136834 A1 | 6/2005 | Bonta et al. |
| 2005/0138671 A1 | 6/2005 | Love et al. |
| 2005/0197098 A1 | 9/2005 | Trossen |
| 2005/0228853 A1 | 10/2005 | Yamamura et al. |
| 2005/0243719 A1 * | 11/2005 | Haverinen et al. ............ 370/230 |
| 2005/0254472 A1 | 11/2005 | Roh et al. |
| 2005/0286476 A1 | 12/2005 | Crosswy et al. |
| 2006/0005008 A1 | 1/2006 | Kao |
| 2006/0007863 A1 | 1/2006 | Naghian |
| 2006/0009248 A1 | 1/2006 | Sakamoto et al. |
| 2006/0056368 A1 | 3/2006 | Ratiu et al. |
| 2006/0064589 A1 | 3/2006 | Taniguchi et al. |
| 2006/0092939 A1 | 5/2006 | Duggi et al. |
| 2006/0098598 A1 | 5/2006 | Gallagher |
| 2006/0101400 A1 | 5/2006 | Capek et al. |
| 2006/0114825 A1 | 6/2006 | McAuley et al. |
| 2006/0114850 A1 | 6/2006 | Avinash et al. |
| 2006/0143026 A1 | 6/2006 | Jagannathan et al. |
| 2006/0176852 A1 | 8/2006 | Wu et al. |
| 2006/0178149 A1 | 8/2006 | Kamat et al. |
| 2006/0215576 A1 | 9/2006 | Yu et al. |
| 2006/0217062 A1 | 9/2006 | Saffre et al. |
| 2006/0221858 A1 | 10/2006 | Switzer et al. |
| 2006/0227724 A1 | 10/2006 | Thubert et al. |
| 2006/0229080 A1 | 10/2006 | Khan et al. |
| 2006/0236105 A1 | 10/2006 | Brok et al. |
| 2006/0240828 A1 | 10/2006 | Jain et al. |
| 2006/0258391 A1 | 11/2006 | Lee |
| 2006/0268767 A1 | 11/2006 | Sato et al. |
| 2007/0008902 A1 | 1/2007 | Yaramada et al. |
| 2007/0016262 A1 | 1/2007 | Gross et al. |
| 2007/0038743 A1 | 2/2007 | Hellhake et al. |
| 2007/0042769 A1 | 2/2007 | Thommana et al. |
| 2007/0076875 A1 | 4/2007 | Kaechi |
| 2007/0097906 A1 | 5/2007 | Kato |
| 2007/0110009 A1 | 5/2007 | Bachmann et al. |
| 2007/0111705 A1 | 5/2007 | Zhang et al. |
| 2007/0149139 A1 | 6/2007 | Gauvreau |
| 2007/0172040 A1 | 7/2007 | Cesarini et al. |
| 2007/0198656 A1 | 8/2007 | Mazzaferri |
| 2007/0206527 A1 | 9/2007 | Lo et al. |
| 2007/0217433 A1 | 9/2007 | Doppler et al. |
| 2007/0220219 A1 | 9/2007 | Bansal et al. |
| 2007/0223408 A1 | 9/2007 | Thielke et al. |
| 2007/0234061 A1 | 10/2007 | Teo |
| 2007/0253376 A1 | 11/2007 | Bonta et al. |
| 2007/0254614 A1 | 11/2007 | Muralidharan et al. |
| 2007/0291722 A1 | 12/2007 | Lee |
| 2008/0040481 A1 | 2/2008 | Joshi et al. |
| 2008/0046542 A1 | 2/2008 | Sano |
| 2008/0049689 A1 | 2/2008 | Nakfour et al. |
| 2008/0069105 A1 | 3/2008 | Costa et al. |
| 2008/0080387 A1 | 4/2008 | Wang et al. |
| 2008/0081606 A1 | 4/2008 | Cole |
| 2008/0081623 A1 | 4/2008 | Burgan et al. |
| 2008/0089288 A1 | 4/2008 | Anschutz et al. |
| 2008/0095114 A1 | 4/2008 | Dutta et al. |
| 2008/0095134 A1 | 4/2008 | Chen et al. |
| 2008/0112355 A1 | 5/2008 | Krishnakumar et al. |
| 2008/0112362 A1 * | 5/2008 | Korus ............... 370/331 |
| 2008/0139239 A1 | 6/2008 | O'Connor |
| 2008/0146232 A1 | 6/2008 | Knisely |
| 2008/0165735 A1 * | 7/2008 | Chen et al. ............... 370/331 |
| 2008/0165786 A1 | 7/2008 | Ahuja et al. |
| 2008/0192666 A1 | 8/2008 | Koskan et al. |

(56) References Cited

U.S. PATENT DOCUMENTS

| | | | |
|---|---|---|---|
| 2008/0254800 A1* | 10/2008 | Chun et al. ................. 455/438 |
| 2008/0298284 A1 | 12/2008 | Dawson et al. |
| 2009/0046591 A1 | 2/2009 | Krishnaswamy et al. |
| 2009/0046598 A1 | 2/2009 | Krishnaswamy et al. |
| 2009/0046644 A1 | 2/2009 | Krishnaswamy et al. |
| 2009/0046676 A1 | 2/2009 | Krishnaswamy et al. |
| 2009/0046861 A1 | 2/2009 | Krishnaswamy |
| 2009/0047930 A1 | 2/2009 | Krishnaswamy et al. |
| 2009/0047964 A1 | 2/2009 | Krishnaswamy |
| 2009/0047966 A1 | 2/2009 | Krishnaswamy et al. |
| 2009/0049158 A1 | 2/2009 | Krishnaswamy et al. |
| 2009/0073943 A1 | 3/2009 | Krishnaswamy et al. |
| 2009/0125429 A1 | 5/2009 | Takayama |
| 2009/0172391 A1 | 7/2009 | Kasapidis |
| 2010/0034131 A1 | 2/2010 | Kasapi et al. |
| 2010/0173631 A1 | 7/2010 | Kim et al. |
| 2010/0202428 A1 | 8/2010 | Thompson et al. |
| 2011/0019627 A1 | 1/2011 | Krishnaswamy et al. |
| 2011/0026477 A1 | 2/2011 | Sinivaara et al. |
| 2011/0039566 A1 | 2/2011 | Zee et al. |
| 2011/0183685 A1 | 7/2011 | Burton et al. |
| 2012/0027001 A1 | 2/2012 | Krishnaswamy et al. |
| 2014/0241296 A1 | 8/2014 | Shattil |

FOREIGN PATENT DOCUMENTS

| | | |
|---|---|---|
| CN | 1435027 A | 8/2003 |
| CN | 1602109 A | 3/2005 |
| CN | 1736041 A | 2/2006 |
| CN | 1741485 A | 3/2006 |
| CN | 1747449 A | 3/2006 |
| CN | 1921418 A | 2/2007 |
| CN | 1929384 A | 3/2007 |
| CN | 1961531 A | 5/2007 |
| DE | 10208689 | 9/2003 |
| DE | 10208689 A1 | 9/2003 |
| DE | 1005021315 | 12/2005 |
| DE | 102005021315 | 12/2005 |
| EP | 1289200 | 3/2003 |
| EP | 1289200 A1 | 3/2003 |
| EP | 1445893 A2 | 8/2004 |
| EP | 1458151 | 9/2004 |
| EP | 1458151 A1 | 9/2004 |
| EP | 1178644 B1 | 7/2006 |
| EP | 1677462 A1 | 7/2006 |
| EP | 1701486 | 9/2006 |
| EP | 1701486 A1 | 9/2006 |
| EP | 1761082 A1 | 3/2007 |
| EP | 1775972 A1 | 4/2007 |
| GB | 2398462 | 8/2001 |
| GB | 2388276 | 11/2003 |
| GB | 2398462 | 8/2004 |
| GB | 2408173 | 5/2005 |
| JP | 2000115171 A | 4/2000 |
| JP | 2001275145 A | 10/2001 |
| JP | 2002510447 A | 4/2002 |
| JP | 2002544727 A | 12/2002 |
| JP | 2003070068 A | 3/2003 |
| JP | 2003101553 A | 4/2003 |
| JP | 2003143644 A | 5/2003 |
| JP | 2003230167 A | 8/2003 |
| JP | 2004153529 A | 5/2004 |
| JP | 2004519911 A | 7/2004 |
| JP | 2004253885 A | 9/2004 |
| JP | 2004264976 A | 9/2004 |
| JP | 2004320775 A | 11/2004 |
| JP | 2005500766 A | 1/2005 |
| JP | 2005502273 A | 1/2005 |
| JP | 2005033808 A | 2/2005 |
| JP | 2005117656 A | 4/2005 |
| JP | 2005123781 A | 5/2005 |
| JP | 2005176021 A | 6/2005 |
| JP | 2005204213 A | 7/2005 |
| JP | 2005523666 A | 8/2005 |
| JP | 2005295310 A | 10/2005 |
| JP | 2005531958 A | 10/2005 |
| JP | 2005536131 A | 11/2005 |
| JP | 2005341290 A | 12/2005 |
| JP | 2005348397 A | 12/2005 |
| JP | 2005536913 A | 12/2005 |
| JP | 2006013811 A | 1/2006 |
| JP | 2006502670 A | 1/2006 |
| JP | 2006041633 A | 2/2006 |
| JP | 2006050224 A | 2/2006 |
| JP | 2006505987 A | 2/2006 |
| JP | 2006074621 A | 3/2006 |
| JP | 2006163793 A | 6/2006 |
| JP | 2006197462 A | 7/2006 |
| JP | 2006287426 A | 10/2006 |
| JP | 2006304005 A | 11/2006 |
| JP | 2007036828 A | 2/2007 |
| JP | 2007037111 A | 2/2007 |
| JP | 2007074382 A | 3/2007 |
| JP | 2007505553 A | 3/2007 |
| JP | 2007508781 A | 4/2007 |
| JP | 2007116710 A | 5/2007 |
| JP | 2007129380 A | 5/2007 |
| JP | 2007143066 A | 6/2007 |
| JP | 2007522725 A | 8/2007 |
| JP | 2007528162 A | 10/2007 |
| JP | 2009500958 | 1/2009 |
| JP | 2009500984 A | 1/2009 |
| JP | 2009526418 A | 7/2009 |
| JP | 4504934 | 7/2010 |
| JP | 2010537575 | 12/2010 |
| JP | 5335793 B2 | 11/2013 |
| KR | 1020070034060 | 3/2007 |
| RU | 2192049 C1 | 10/2002 |
| RU | 2206177 C1 | 6/2003 |
| RU | 2273050 C2 | 3/2006 |
| RU | 2301444 | 6/2007 |
| TW | I242937 B | 11/2005 |
| TW | I243620 | 11/2005 |
| TW | I246005 B | 12/2005 |
| TW | I246344 B | 12/2005 |
| WO | 9013211 | 11/1990 |
| WO | 9013211 A1 | 11/1990 |
| WO | 0069186 | 11/2000 |
| WO | 0069186 A1 | 11/2000 |
| WO | WO0199053 A2 | 12/2001 |
| WO | 02063900 | 8/2002 |
| WO | 02063900 A1 | 8/2002 |
| WO | WO02063990 A1 | 8/2002 |
| WO | WO02071084 A1 | 9/2002 |
| WO | WO02096132 A1 | 11/2002 |
| WO | WO03017705 A1 | 2/2003 |
| WO | WO03090847 A2 | 11/2003 |
| WO | 2004002208 A2 | 1/2004 |
| WO | WO2004004226 A2 | 1/2004 |
| WO | WO2004017549 A2 | 2/2004 |
| WO | WO2004017568 A1 | 2/2004 |
| WO | WO2004034219 A2 | 4/2004 |
| WO | 2004043008 A1 | 5/2004 |
| WO | WO2004107656 A1 | 12/2004 |
| WO | WO2005036348 A2 | 4/2005 |
| WO | WO2005072183 A2 | 8/2005 |
| WO | 2005086468 A1 | 9/2005 |
| WO | WO2005088874 A1 | 9/2005 |
| WO | WO2005109693 A1 | 11/2005 |
| WO | WO2005116841 A1 | 12/2005 |
| WO | WO2006000239 A1 | 1/2006 |
| WO | WO2006024343 A1 | 3/2006 |
| WO | 2006043902 | 4/2006 |
| WO | 2006043902 A1 | 4/2006 |
| WO | WO2006043901 | 4/2006 |
| WO | 2006068878 A1 | 6/2006 |
| WO | WO2006061682 A1 | 6/2006 |
| WO | WO2006117738 A1 | 11/2006 |
| WO | 2007004051 | 1/2007 |
| WO | 2007004051 A1 | 1/2007 |
| WO | 2007008751 A1 | 1/2007 |
| WO | WO2007008574 | 1/2007 |
| WO | WO2007024932 | 3/2007 |

(56) References Cited

FOREIGN PATENT DOCUMENTS

| WO | WO2007047118 A2 | 4/2007 |
|---|---|---|
| WO | 2007052249 | 5/2007 |
| WO | 2007052249 A2 | 5/2007 |
| WO | 2007064249 | 6/2007 |
| WO | 2007064249 A1 | 6/2007 |
| WO | WO2007090176 | 8/2007 |
| WO | WO2007091699 | 8/2007 |
| WO | 2008063728 | 5/2008 |
| WO | 2008063728 A2 | 5/2008 |
| WO | 2009026109 A1 | 2/2009 |
| WO | WO2009026192 | 2/2009 |
| WO | WO2010000870 A1 | 1/2010 |

OTHER PUBLICATIONS

European Search Report—EP08006428, European Search Authority—The Hague—Jan. 15, 2009.
European Search Report—EP08006429, European Search Authority—The Hague—Nov. 26, 2008.
International Search Report—PCT/US08/072464, International Search Authority—European Patent Office—Mar. 3, 2009.
International Search Report—PCT/US08/072515, International Search Authority—European Patent Office—Feb. 4, 2009.
International Search Report—PCT/US08/072863, International Search Authority—European Patent Office—Dec. 4, 2008.
International Search Report—PCT/US08/072866, International Search Authority—European Patent Office—Jan. 29, 2009.
International Search Report—PCT/US08/072872, International Search Authority—European Patent Office—Dec. 29, 2008.
International Search Report—PCT/US08/073017, International Search Authority—European Patent Office—Feb. 27, 2009.
International Search Report—PCT/US08/073031, International Search Authority—European Patent Office—Feb. 4, 2009.
International Search Report—PCT/US08/073217, International Search Authority—European Patent Office—Dec. 16, 2008.
International Search Report—PCT/US08/073321, International Search Authority—European Patent Office—Feb. 10, 2009.
International Search Report—PCT/US08/073409, International Search Authority—European Patent Office—Mar. 18, 2009.
Partial International Search Report—PCT/US08/072464, International Search Authority—European Patent Office—Nov. 18, 2008.
Partial International Search Report—PCT/US08/073409, International Search Authority—European Patent Office—Jan. 8, 2009.
Sengupta S et al: "Dynamic pricing for service provisioning and network selection in heterogeneous networks" Physical Communication, vol. 2, No. 1-2, 39-43 Mar. 1, 2009, pp. 138-150, XP026110196 ISSN: 1874-4907 [retrieved on Mar. 9, 2009] abstract.
Written Opinion—PCT/US08/072464, International Search Authority—European Patent Office—Mar. 3, 2009.
Written Opinion—PCT/US08/072515, International Search Authority—European Patent Office—Feb. 4, 2009.
Written Opinion—PCT/US08/072863, International Search Authority—European Patent Office—Dec. 4, 2008.
Written Opinion—PCT/US08/072866, International Search Authority—European Patent Office—Jan. 29, 2009.
Written Opinion—PCT/US08/072872, International Search Authority—European Patent Office—Dec. 29, 2008.
Written Opinion—PCT/US08/073017, International Search Authority—European Patent Office—Feb. 27, 2009.
Written Opinion—PCT/US08/073031, International Search Authority—European Patent Office—Feb. 4, 2009.
Written Opinion—PCT/US08/073217, International Search Authority—European Patent Office—Dec. 16, 2008.
Written Opinion—PCT/US08/073321, International Search Authority—European Patent Office—Feb. 10, 2009.
Written Opinon—PCT/US08/073409, International Search Authority—European Patent Office—Mar. 18, 2009.
Ying Qiu, Peter Marbach: "Bandwidth Allocation in Ad Hoc Networks: a Price-Based Approach" IEEE INFOCOM 2003, [Online] Jul. 3, 2003, pp. 1-11, XP002603370 infocom 2003 Retrieved from the Internet: URL:http://www.i eee-infocom.org/2003/paper s/20_01.PDF> [retrieved on Oct. 4, 2010] p. 1, col. 1, line 9, paragraph 1—p. 4, col. 1, line 20, paragraph II. E p. 9, col. 2, line 5, paragraph VIII—p. 11, col. 1, line 18, paragraph IX.
Sethom et al: "Secure and seamless mobility support in heterogeneous wireless networks" Global Telecommunications Conference 2005. Globecom '05, IEEE St. Loius, MO, USA, Nov.28-Dec. 2, 2005, Psicataway, NJ, USA, IEEE. vol. 6, Nov. 28, 2005, pp. 34.
Ashutosh,H et al.: "Seamless proactive handover across heterogeneous access networks" Wirless Personal Communciations, Kluwer Academic Publishers, DO, vol. 43, No. 3, Jun. 28, 2007, pp. 837-855, XP019557974.
Ming et al.: "Ad hoc assisted handoff for real-time voice in IEEE 802.11 infrastructure WLANs" Wireless Communications and Networks Conference, 2004. WCNC. 2004 IEEE Atlanta, GA, USA Mar. 21-25, 2004, Piscaraway, NJ, USA, IEEE, vol. 1, Mar. 21, 2004, pp. 202-206.
Bharat et al.: "Integrating Heterogeneous Wireless Technologies: A Cellular Aided Mobiie Ad Hoc Network (CAMA)" Mobile Networks and Applications, Kluwer Academic Publishers, BO, vol. 9, No. 4, Aug. 1, 2004, pp. 393-408, XP019213788.
Cradlepoint Technology, "CTR350 Mobile Broadband Travel Router: Ethernet, USB Modem Support", Dec. 2008.
FON Wiki Beta, "Allen, Linus and Bill", http://wiki.fon.com/wiki/allen2%_linus_and_Bill, Feb. 27, 2009.
FON Wiki Beta, "FON Spot", http://wiki.fon.com/wiki/FON_Spot, Apr. 6, 2009.
Taiwan Search Report—TW097131375—TIPO—Dec. 22, 2011.
Park, Mirang et al., "A Study of a Seamless User Authentication Protocol on Wireless LAN Systems," Journal of the Information Processing Society of Japan, The Information Processing Society of Japan, Jul. 15, 2006, 47(7), pp. 2058-2070.
Sethom, et al: "Secure and seamless mobility support in heterogeneous wireless networks" Global Telecommunications Conference 2005. GLOBECOM'05. IEEE St. Loius, MO, USA, Nov. 28,-Dec. 2, 2005, Psicataway, NJ, USA, IEEE. vol. 6, Nov. 28, 2005, p. 34.
Dimitriadis et al: "Seamless continuity of real-time video across umts and wlan networks: challenges and performance evaluation" IEEE Personal Communications, IEEE Communications Society, US, vol. 12, No. 3, Jun. 1, 2005, pp. 8-18, XP011134871.
Ashutosh, et al., "Seamless proactive handover across heterogeneous access networks" Wirless Personal Communciations, Kluwer Academic Publishers, DO, vol. 43, No. 3, Jun. 28, 2007, pp. 837-855, XP019557974.
Ming, et al., "Ad hoc assisted handoff for real-time voice in IEEE 802.11 infrastructure WLANs" Wireless Communications and Networks Conference, 2004. WCNC. 2004 IEEE Atlanta, GA, USA Mar. 21-25, 2004, Piscaraway, NJ, USA, IEEE, vol. 1, Mar. 21, 2004, pp. 202-206.
Bharat Bhargava, et al., "Integrating Heterogeneous Wireless Technologies: A Cellular Aided Mobile Ad Hoc Network (CAMA)" Mobile Networks and Applications, Kluwer Academic Publishers, BO, vol. 9, No. 4, Aug. 1, 2004, pp. 393-408, XP019213788.
International Search Report—PCT/US08/073218, International Search Authority—European Patent Office—Jan. 5, 2009.
Written Opinion—PCT/US08/073218, International Search Authority—European Patent Office—Jan. 5, 2009.
Cradlepoint Technology, "CTR350 Mobile Broadband Travel Router: Ethernet, USB Modem Support", Dec. 2008.
Cradlepoint Technology, "CTR500 Mobile Broadband Router: Ethernet, USB, and ExpressCard Modem Support" Dec. 2008.
FON Wiki Beta, "Alien, Linus and Bill", http://wiki.fon.com/wiki/alien2%_linus_and_Bill, Feb. 27, 2009.
FON Wiki Beta, "Fon Spot" pp. 1-3, year 2009, http://wiki.fon.comlwiki/FON_Spot.
Kyocera, "KR1 Mobile Router: Technical Specifications" 2006 Kyocera Wireless Corp.
Steiner, et al., "Kerberos: An Authentication Service for Open Network Systems", Jan. 12, 1988.

* cited by examiner

HANDOFF AT AN AD-HOC MOBILE SERVICE PROVIDER

CROSS-REFERENCE TO RELATED APPLICATIONS

The present application for patent claims priority under 35 U.S.C. §119 to Provisional Application No. 60/956,658 entitled, "Method for a Heterogeneous Wireless Ad Hoc Mobile Service Provider," filed Aug. 17, 2007 and Provisional Application No. 60/980,557 entitled, "Handoff In Ad-Hoc Mobile Broadband Networks," filed Oct. 17, 2007.

BACKGROUND

1. Field

The present disclosure relates generally to telecommunications, and more specifically to handoff in an ad-hoc mobile broadband network.

2. Background

Wireless telecommunication systems are widely deployed to provide various services to consumers, such as telephony, data, video, audio, messaging, broadcasts, etc. These systems continue to evolve as market forces drive wireless telecommunications to new heights. Today, wireless networks are providing broadband Internet access to mobile subscribers over a regional, a nationwide, or even a global region. Such networks are sometimes referred as Wireless Wide Area Networks (WWANs). WWAN operators generally offer wireless access plans to their subscribers such as subscription plans at a monthly fixed rate.

Accessing WWANs from all mobile devices may not be possible. Some mobile devices may not have a WWAN radio. Other mobile devices with a WWAN radio may not have a subscription plan enabled. Ad-hoc networking allows mobile devices to dynamically connect over wireless interfaces using protocols such as WLAN, Bluetooth, UWB or other protocols. There is a need in the art for a methodology to allow a user of a mobile device without WWAN access to dynamically subscribe to wireless access service provided by a user with a WWAN-capable mobile device using wireless ad-hoc networking between the mobile devices belong to the two users.

SUMMARY

In one aspect of the disclosure, an ad-hoc service provider includes a processing system configured to support pre-authentication with a server for the purpose of receiving a handoff of a mobile client from another ad-hoc service provider, the processing system being further configured to enable the mobile client to maintain a session with the server while receiving the handoff from said another ad-hoc service provider.

In another aspect of the disclosure, a method of receiving a handoff at an ad-hoc service provider includes supporting pre-authentication with a server for the purpose of receiving a handoff of a mobile client from another ad-hoc service provider, and enabling the mobile client to maintain a session with the server while receiving the handoff from said another ad-hoc service provider.

In a further aspect of the disclosure, an ad-hoc service provider includes means for supporting pre-authentication with a server for the purpose of receiving a handoff of a mobile client from another ad-hoc service provider, and means for enabling the mobile client to maintain a session with the server while receiving the handoff from said another ad-hoc service provider.

In yet a further aspect of the disclosure, a machine-readable medium includes instructions executable by a processing system in a mobile server provider, the instructions include code for supporting pre-authentication with a server for the purpose of receiving a handoff of a mobile client from another ad-hoc service provider, and code for enabling the mobile client to maintain a session with the server while receiving the handoff from said another ad-hoc service provider.

It is understood that other aspects of the disclosure will become readily apparent to those skilled in the art from the following detailed description, wherein various aspects of an ad-hoc mobile broadband network are shown and described by way of illustration. As will be realized, these aspects of the disclosure are capable of other and different configurations and its several details are capable of modification in various other respects. Accordingly, the drawings and detailed description are to be regarded as illustrative in nature and not as restrictive.

DETAILED DESCRIPTION

The detailed description set forth below in connection with the appended drawings is intended as a description of various aspects of an ad-hoc mobile broadband network and is not intended to represent the only aspects which are encompassed by the claims. The detailed description includes specific details for the purpose of providing a thorough understanding of these aspects. However, it will be apparent to those skilled in the art that various aspects of an ad-hoc mobile broadband network may be practiced without these specific details. In some instances, well-known structures and components are shown in block diagram form in order to avoid obscuring the various concepts presented throughout this disclosure.

Figure 1:
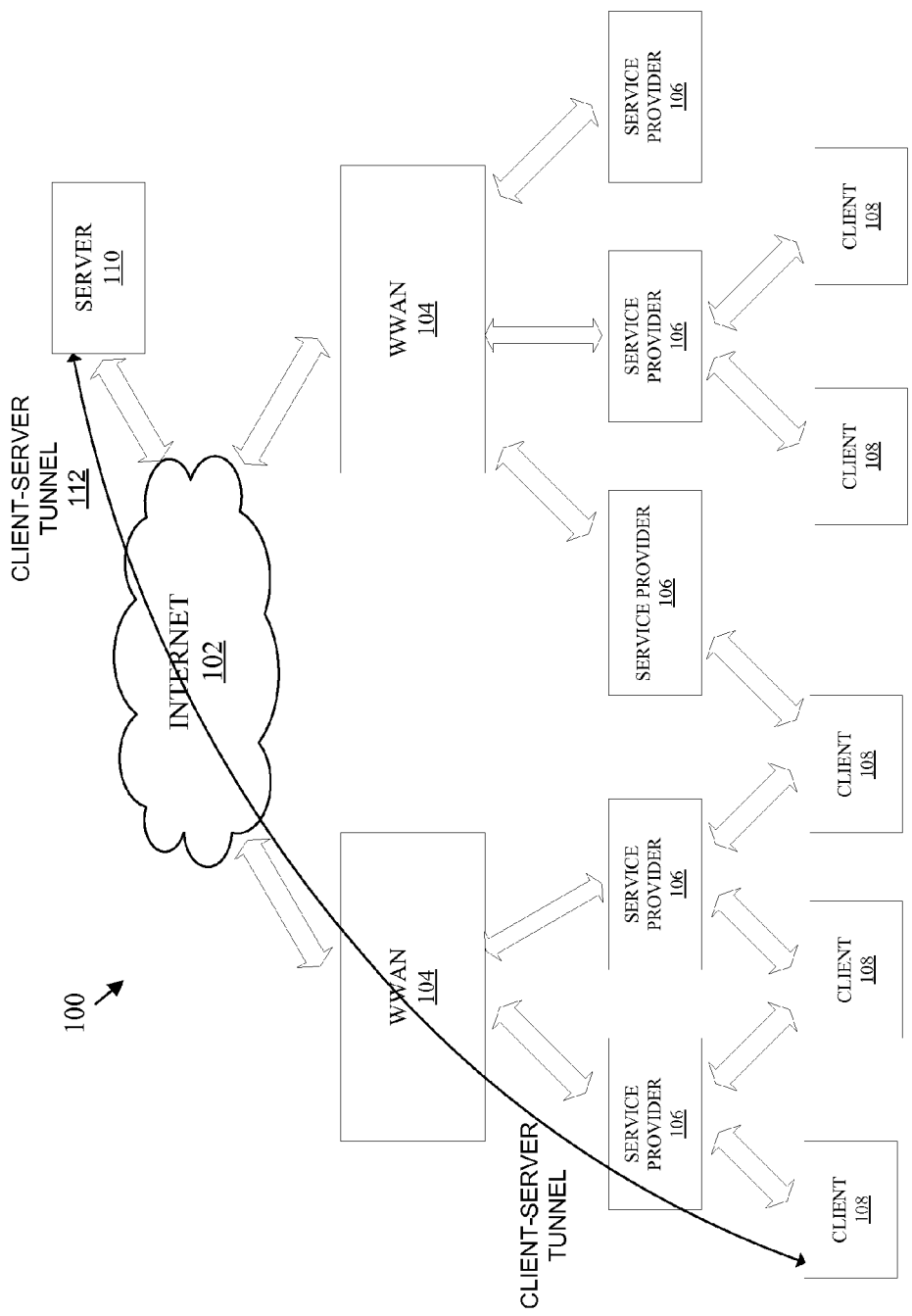
FIG. 1 is a simplified block diagram illustrating an example of a telecommunications system.

FIG. 1 is a simplified block diagram illustrating an example of a telecommunications system. The telecommunications system 100 is shown with multiple WWANs that provide broadband access to a network 102 for mobile subscribers. The network 102 may be a packet-based network such as the Internet or some other suitable network. For clarity of presentation, two WWANs 104 are shown with a backhaul connection to the Internet 102. Each WWAN 104 may be implemented with multiple fixed-site base stations (not shown) dispersed throughout a geographic region. The geographic region may be generally subdivided into smaller regions known as cells. Each base station may be configured to serve all mobile subscribers within its respective cell. A base station controller (not shown) may be used to manage and coordinate the base stations in the WWAN 104 and support the backhaul connection to the Internet 102.

Each WWAN 104 may use one of many different wireless access protocols to support radio communications with mobile subscribers. By way of example, one WWAN 104 may support Evolution-Data Optimized (EV-DO), while the other WWAN 104 may support Ultra Mobile Broadband (UMB). EV-DO and UMB are air interface standards promulgated by the 3rd Generation Partnership Project 2 (3GPP2) as part of the CDMA2000 family of standards and employs multiple access techniques such as Code Division Multiple Access (CDMA) to provide broadband Internet access to mobile subscribers. Alternatively, one of WWAN 104 may support Long Term Evolution (LTE), which is a project within the 3GPP2 to improve the Universal Mobile Telecommunications System (UMTS) mobile phone standard based primarily on a Wideband CDMA (W-CDMA) air interface. One of WWAN 104 may also support the WiMAX standard being developed by the WiMAX forum. The actual wireless access protocol employed by a WWAN for any particular telecommunications system will depend on the specific application and the overall design constraints imposed on the system. The various techniques presented throughout this disclosure are equally applicable to any combination of heterogeneous or homogeneous WWANs regardless of the wireless access protocols utilized.

Each WWAN 104 has a number of mobile subscribers. Each subscriber may have a mobile node 106 capable of accessing the Internet 102 directly through the WWAN 104. In the telecommunications system shown in FIG. 1, these mobile nodes 106 access the WWAN 104 using a EV-DO, UMB or LTE wireless access protocol; however, in actual implementations, these mobile nodes 106 may be configured to support any wireless access protocol.

One or more of these mobile nodes 106 may be configured to create in its vicinity an ad-hoc network based on the same or different wireless access protocol used to access the WWAN 104. By way of example, a mobile node 106 may support a UMB wireless access protocol with a WWAN, while providing an IEEE 802.11 access point for mobile nodes 108 that cannot directly access a WWAN. IEEE 802.11 denotes a set of Wireless Local Access Network (WLAN) standards developed by the IEEE 802.11 committee for short-range communications (e.g., tens of meters to a few hundred meters). Although IEEE 802.11 is a common WLAN wireless access protocol, other suitable protocols may be used.

A mobile node 106 that may be used to provide an access point for another mobile node 108 will be referred to herein as an "ad-hoc service provider." A mobile node 108 that may use an access point of an ad-hoc service provider 106 will be referred to herein as a "mobile client." A mobile node, whether an ad-hoc service provider 106 or a mobile client 108, may be a laptop computer, a mobile telephone, a personal digital assistant (PDA), a mobile digital audio player, a mobile game console, a digital camera, a digital camcorder, a mobile audio device, a mobile video device, a mobile multimedia device, or any other device capable of supporting at least one wireless access protocol.

The ad-hoc service provider 106 may extend its wireless broadband Internet access service to mobile clients 108 that would otherwise not have Internet access. A server 110 may be used as an "exchange" to enable mobile clients 108 to purchase unused bandwidth from ad-hoc service providers 106 to access, for example, the Internet 102 across WWANs 104.

An ad-hoc service provider 106, a server 110, and one or more mobile clients 108 may establish a network that is an ad-hoc heterogeneous wireless network. By way of example, a heterogeneous wireless network may include at least two types of wireless networks (e.g., a WWAN and a WLAN). By way of example, an ad-hoc network may be a network whose specific configuration may change from time to time or from the formation of one network to the next. The network configuration is not pre-planned prior to establishing the network. Examples of configurations for an ad-hoc network may include a configuration as to which members are to be in the network (e.g., which ad-hoc service provider, which server, and/or which mobile client(s) are to be included in a network), a configuration as to the geographic locations of an ad-hoc service provider and mobile client(s), and a configuration as to when and how long a network is to be established.

In one example of an exchange, mobile clients 108 register with the server 110. Once registered, a mobile client 108 may search for available ad-hoc service providers 106 when Internet access is desired. When the mobile client 108 detects the presence of one or more ad-hoc service providers 106, it may select a ad-hoc service provider 106 to initiate a session with based on various parameters such as bandwidth, Quality of Service (QoS) and cost. Another parameter that may be used by the mobile client 108 to select a ad-hoc service provider 106 is availability in terms of time. By way of example, a mobile subscriber in an airport may turn on his mobile node (e.g., a laptop computer or a mobile telephone) and use it as an ad-hoc service provider 108 for 30 minutes as he awaits his flight. A mobile client 108 requiring access to the Internet 102 for 45 minutes may choose not to select this ad-hoc service provider 106 even if the ad-hoc service provider 108 can provide adequate bandwidth with good QoS. Another mobile client 108, however, requiring Internet access for 15 minutes, may select this ad-hoc service provider 106 because of its bandwidth and QoS. In any event, once a mobile client 108 selects an ad-hoc service provider 106, a session may be established based on the parameters negotiated be the two (e.g., bandwidth, QoS, duration of the session, etc.). A link encryption key may be established between the mobile client 108 and the ad-hoc service provider 106 during the establishment of the session. A Secured Socket Layer Virtual Private Network (SSL VPN) session may be established between the mobile client 108 and the server 110. The transport layer ports may be kept in the open and not encrypted to provide visibility for the network address translation functionality at the ad-hoc service provider 106. In this example, all Internet traffic is routed through the server 110 via a client-server tunnel 112 to provide security.

In some telecommunication systems, once a mobile client 108 has gained access to the Internet 102, it listens for other ad-hoc service providers 106 and measures the signal strength of the ad-hoc service providers 106 it can hear. The mobile client 108 uses these measurements to create an active list. The active list is a list of ad-hoc service providers 106 that can provide service to the mobile client 108. The mobile client 108 will continue to measure the signal strength of other ad-hoc service providers 106 and may add or remove ad-hoc service providers 106 from the active list as the configuration of the ad-hoc network changes.

One function of the active set is to allow the mobile client 108 to quickly switch between ad-hoc service providers 106 while maintaining the current session with the server 110. The mobile client 108 may consider a handoff to another ad-hoc service provider 106 based on any number of factors. These factors may include, by way of example, the inability of the ad-hoc service provider 106 to provide the bandwidth or QoS negotiated at the beginning of the session. Alternatively, the ad-hoc service provider 106 may not be able to provide Internet access to the mobile client 108 for the entire duration of the session. It would not be uncommon for a mobile subscriber on an ad-hoc service provider 106 that negotiates a 30 minute session with a mobile client 108 to leave the vicinity 15 minutes into the session for whatever reason. In that event, the mobile client 108 would need to select a new ad-hoc service provider from the active list for handoff. The server 110 uses the active list to pre-authenticate other ad-hoc service providers for handoff during the session between the mobile client 108 and the current ad-hoc service provider 106. By pre-authenticating the ad-hoc service provider 106 in the active list before the ad-hoc service provider 106 currently serving the mobile client 108 goes down, the time required to handoff the mobile client 108 can be reduced.

The term "pre-authenticating" as used herein means authenticating a target ad-hoc service 106 provider for handoff prior to receiving a message from the ad-hoc service provider 106 currently serving the mobile client 108 relating to the unavailability of the current ad-hoc service provider 106. The message may provide notification to the server 110 that the current ad-hoc service provider 106 has gone down and a hard handoff must be performed to another ad-hoc service provider 106 if the session between the mobile client 108 and the server 110 is to be maintained. Alternatively, the message may provide notification to the server 110 that the current ad-hoc service provider 106 will be going down shortly, or that it can no longer provide the mobile client 108 with the service agreed upon (e.g., QoS, bandwidth, etc.). This provides the server 110 with the option of enabling a soft handoff of the mobile client 108 to another ad-hoc service provider 106.

Pre-authentication includes provisioning, prior to handoff, a potential new service provider 106 and a mobile client 108 with encryption/decryption keys that may be needed for communication between the potential new service provider 106 and the mobile client 108.

Pre-authentication also includes provisioning, prior to handoff, the current service provider 106 and the new service provider 106 with encryption/decryption keys that may be needed for communication between the current service provider 106 and the new service provider 106.

Pre-authentication also includes authorization of communication between the potential new service provider 106 and the current service provider 106. It also includes authorization of communication between the potential new service provider 106 and the mobile client 108.

Figure 2:
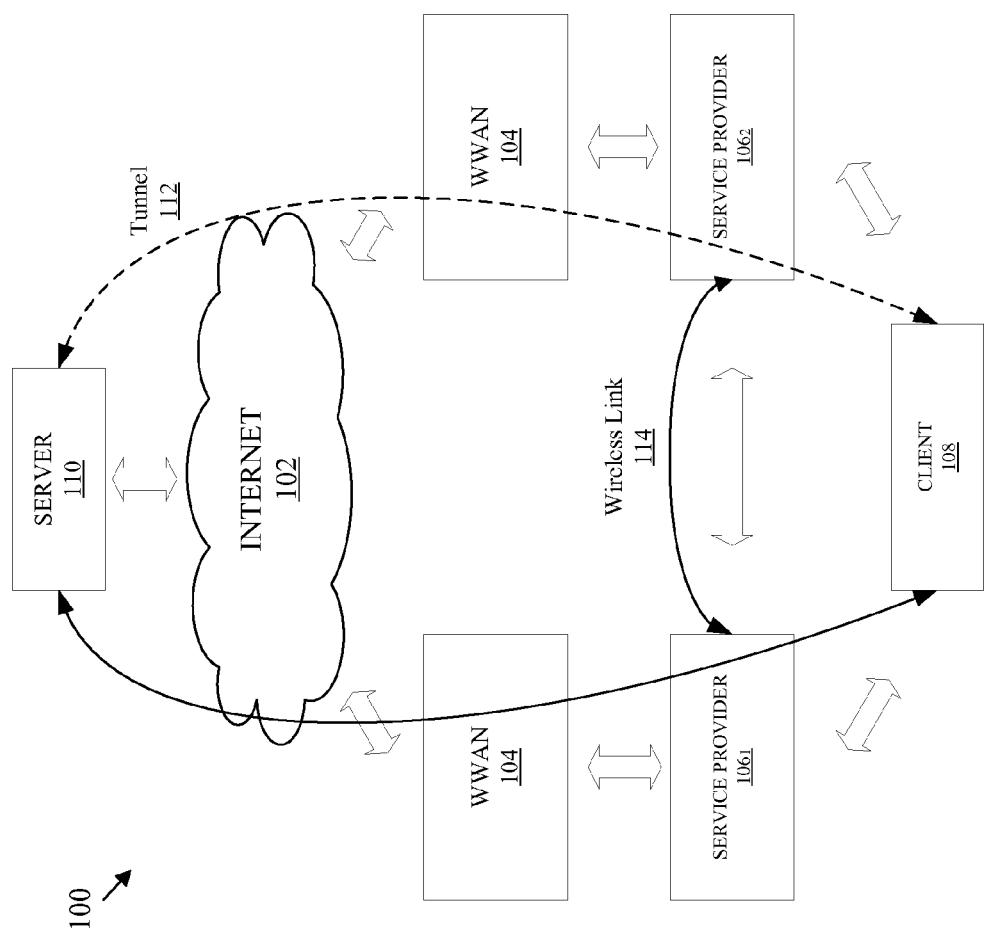
FIG. 2 is a simplified block diagram illustrating an example of a handoff in a telecommunications system.

FIG. 2 is a simplified block diagram illustrating an example of a handoff in a telecommunications system. In this example, the mobile client 108 is being handed off from a current ad-hoc service provider $106_1$ to a target service provider $106_2$. A persistent tunnel 112 between the two ad-hoc service providers $106_1$, $106_2$ is used to maintain the mobile client's session with the server 110 during handoff. Data packets received by the current ad-hoc service provider $106_1$ during handoff may be forwarded to the target ad-hoc service provider $106_2$ through the tunnel 112. Alternatively, or in addition to, the data packets received by the current service provider $106_1$ may be forwarded to the target ad-hoc service provider $106_2$ directly over a wireless link 114 between the two as shown in FIG. 2, or through another ad-hoc service provider (not shown).

The mobile client 108 may have an IPv4, IPv6, or other suitable address that is used by the server 110 to maintain the session. The address may be provided to the mobile client 108 by the server 110 or one of the ad-hoc service providers 106 in the telecommunications network 100 (see FIG. 1). Alternatively, the address may be stored on the mobile client 108. In at least one configuration, the address may be a MobileIP address.

The tunneling anchor is shown in FIG. 2 as a server. However, the tunneling anchor may be any suitable entity or distributed across multiple entities in the telecommunications system 100. The tunneling anchor may be coupled to the Internet 102 as shown in FIG. 2 or located elsewhere. By way of example, the tunneling anchor may be located anywhere on the Internet 102 or within the network operator's infrastructure. Those skilled in the art will be readily able to determine the optimal implementation of the tunneling anchor for any particular application based on the performance requirements, the overall design constraints imposed on the system, and/or other relevant factors.

Figure 3:
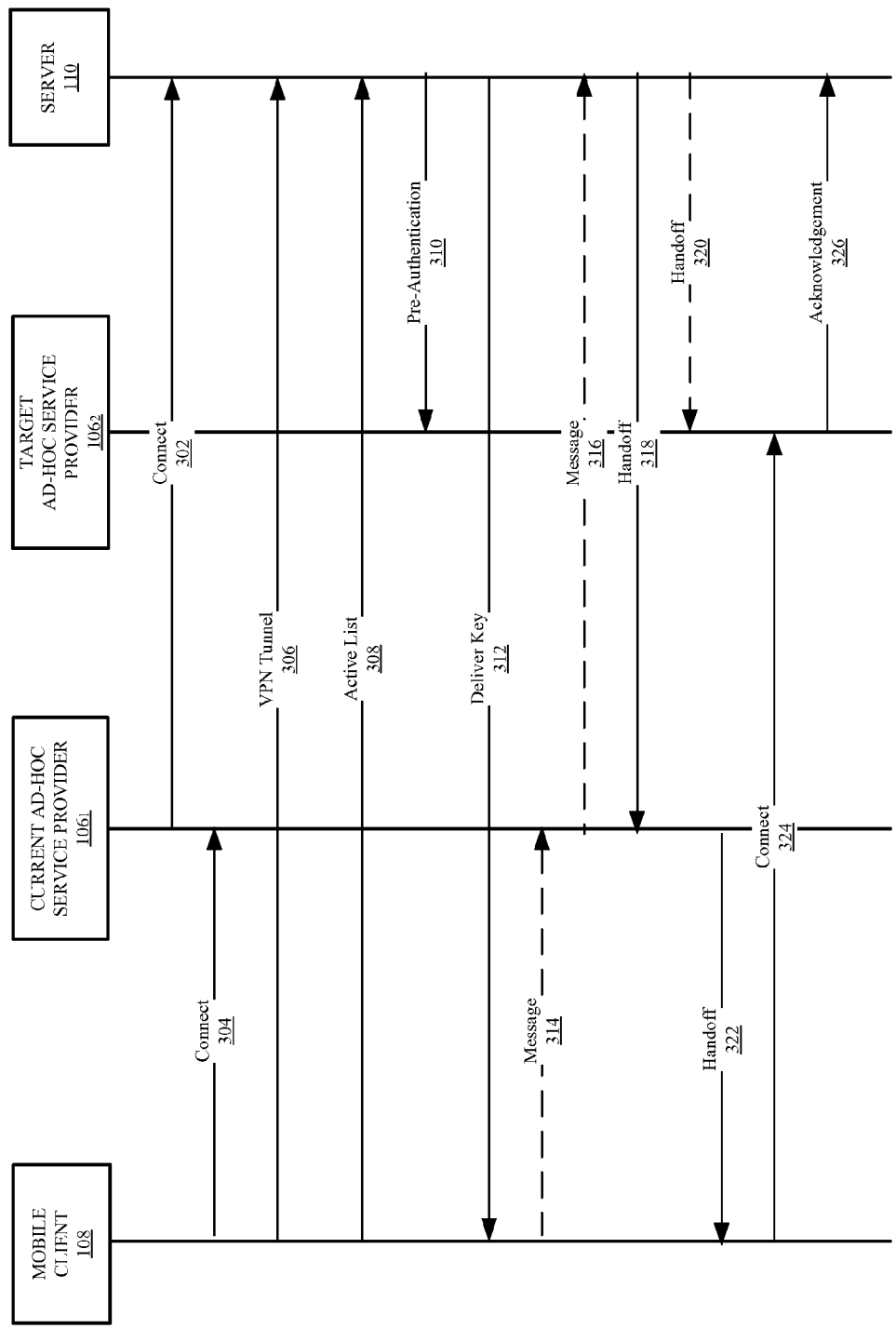
FIG. 3 is a call flow diagram illustrating an example of a pre-authentication process for handoff.

FIG. 3 is a call flow diagram illustrating an example of the authentication process for handoff. For clarity of presentation, various signaling for the ad-hoc service providers 106 and clients 108 to authenticate the server 110 and register with the server 110 will be omitted.

In step 302, a connection may be initiated by an ad-hoc service provider $106_1$ with the server 110 when the ad-hoc service provider $106_1$ is mobile and desires to provide service. Extensible Authentication Protocol-Tunneled Transport Layer Security (EAP-TTLS) may be used for Authentication, Authorization and Accounting (AAA) and secure session establishment for this connection. In step 304, a connection may be initiated by a mobile client 108 with the ad-hoc service provider $106_1$ (hereinafter referred to as the "current ad-hoc service provider") when the mobile client 108 requires Internet access. EAP-TTLS may also be used for AAA and secure session establishment. In particular, the ad-hoc service provider $106_1$ sends the mobile client's credentials to the server 110 for EAP-AAA authentication. The EAP-TTLS authentication response from the server 110 is then used to generate a master shared key. Subsequently, a link encryption key may be established between the current ad-hoc service provider $106_1$ and the mobile client 108. A SSL VPN session may then be established, in step 306, between the mobile client 108 and the server 110.

It should be noted that information flow may be encrypted using encryption/decryption keys between any pair of nodes (where the nodes comprise the server 110, the current service provider $106_1$, the target service provider $106_2$, and the mobile client 108). Such encryption/decryption keys can be set up in the system when nodes in the system connect with the server. Typically symmetric key cryptography such as using AES may be used for such encryption or decryption for message-flow between any pair of nodes in the system.

In step 308, the mobile client 108 provides the active list to the server 110. Alternatively, the mobile client 108 can send a report identifying ad-hoc service providers that it can hear accompanied by data indicating the signal strength measurements for each, and any other service parameters for the service providers that it can infer. The server 110 may use the report to generate the active list at its end.

The server 110 pre-authenticates one or more of the ad-hoc service providers in the active list. During pre-authentication of a target service provider $106_2$ with a client 108, the server 110 provisions the target-service provider $106_2$ with an encryption/decryption key for communication with the client 108. The server may additionally provision the target service provider $106_2$ with an encryption/decryption key for communication with the current service provider $106_1$. The server 110 also provisions the client 108 with the encryption/decryption key to communicate with the target service provider $106_2$. The current service provider $106_1$ can be provisioned by the server 110, either at the time of a handoff or anytime earlier, with the encryption/decryption key to communicate with the target service provider $106_2$. The exact number of ad-hoc service providers in the active list that are pre-authenticated may depend on the admission control policies implemented by the server 110. By way of example, the server 110 may limit the number of ad-hoc service providers at a given location if it determines that additional ad-hoc service providers will adversely affect performance in the WWAN. Additional constraints may be imposed by the WWAN operators that may not want its mobile subscribers to provide service in a given geographic location depending on various network constraints. In any event, the server 110 pre-authenticates one or more ad-hoc service providers by providing each of them with a key to encrypt the data link between the mobile client 108 and the new ad-hoc service provider 106 following handoff. In FIG. 3, the server 110 is shown, in step 310, providing the key to one ad-hoc service provider $106_2$ (hereinafter referred to as the target ad-hoc service provider). In step 312, the server 110 also provides the key to the mobile client 108.

In step 314, the mobile client 108 sends a message to the current ad-hoc service provider 106 requesting a handoff to an alternate service provider. Step 314 is optional and is indicated by a dotted line from the client to the ad-hoc service provider.

In step 316, the current ad-hoc service provider $106_1$ sends a message to the server 110 requesting a handoff. Such a message is tagged with an identifier that indicates that the handoff was initiated by the mobile client 108, or that it was initiated by the current ad-hoc service provider $106_1$. The message may be created at the current ad-hoc service provider $106_1$ as a consequence of the current ad-hoc service provider's unavailability to continue to provide service to the mobile client. Alternatively, the message could have been created at the mobile client (step 314), which needs to be sent by the current ad-hoc service provider $106_1$ to the server 110. For a handoff that is initiated directly by the server, step 316 is optional. For a handoff that is initiated by the mobile client 108, or by the ad-hoc service provider $106_1$, in step 318, the server 110 responds to step 316 by sending a message back to current ad-hoc service provider $106_1$ authorizing handoff. Alternatively, step 318 could be a message from the server initiating a handoff, in the absence of a message 316 from the current ad-hoc service provider $106_1$. The message sent to the current ad-hoc service provider $106_1$ may identify the target ad-hoc service provider $106_2$ for handoff, or alternatively, allow the mobile client 108 to make the decision. In the latter case, the user on the mobile client 108 selects a target ad-hoc service provider for handoff in accordance with any admission control policy constraints imposed by the server 110. The server 110 may also provide the mobile client 108 with a quality metric for each ad-hoc service provider available to the mobile client. This quality metric may be used to assist the user on a mobile client 108 to select a new ad-hoc service provider for handoff. In the example shown in FIG. 3, the mobile client 108 selects the target ad-hoc service provider $106_2$ for handoff.

In step 320, the server may optionally send a message regarding the handoff to one or more target service providers $106_2$. In step 322, the handoff message received from the server 110 is sent by the current service provider $106_1$ to the mobile client 108.

In step 324, the mobile client 108 establishes a connection with the target ad-hoc service provider $106_2$ by sending a message encrypted with a key. Since the target ad-hoc service provider $106_2$ received the same key during the pre-authentication process, it can decrypt the message and establish a session with the mobile client 108 to complete the handoff. The target ad-hoc service provider $106_2$ may also send a message back to the server 110, in step 326, to signify that the handoff has been successfully completed.

Packets that have left the mobile client 108 may be in transit to the current ad-hoc service provider $106_1$, or could be at the current ad-hoc service provider $106_1$. These packets need to continue to be supported by the current ad-hoc service provider $106_1$. Other packets that have left the mobile client 108 may be in transit to the server 110, or may be waiting at server 110 for further processing, or may be in transit to their final destination beyond the tunneling server. Future packets that leave the mobile client 108 are sent to the target ad-hoc service provider $106_2$ after handoff. Packets that are destined to the mobile client 108 may be waiting at the server. Such packets are sent to the target ad-hoc service provider $106_2$ after handoff. Other packets destined for the mobile client 108 may be in transit to the current ad-hoc service provider $106_1$, or may be waiting at the current ad-hoc service provider $106_1$, or may be in transit from the current service provider to the mobile client 108, and the current ad-hoc service provider $106_1$ needs to continue to support such packets to be delivered to the mobile client 108. The delivery of such packets can be done over a wireless link or a multi-hop wireless path between the current ad-hoc service provider $106_1$ and the target ad-hoc service provider $106_2$. Alternatively, such packets can be delivered by the current ad-hoc service provider $106_1$ to the server 110, which then sends them through the target ad-hoc service provider $106_2$. Messages between the current ad-hoc service provider $106_1$ and the target ad-hoc service provider $106_2$ may be exchanged either through the server 110, or over a wireless link or multi-hop wireless path between the service providers.

Figure 4:
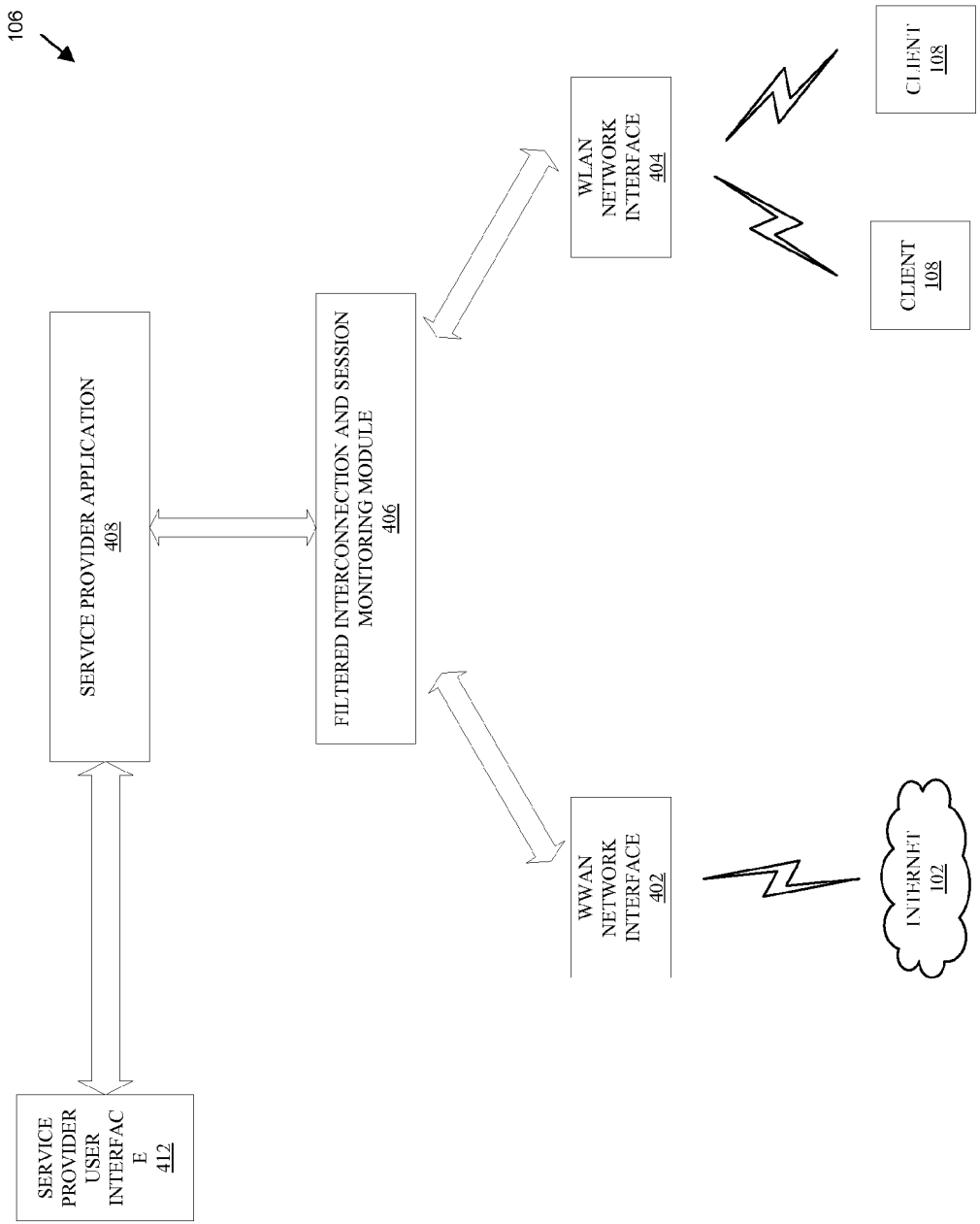
FIG. 4 is a simplified block diagram illustrating an example of the functionality of an ad-hoc service provider.

FIG. 4 is a simplified block diagram illustrating an example of the functionality of an ad-hoc service provider. The ad-hoc service provider 106 has the ability to enable interconnection between wireless links over homogeneous or heterogeneous wireless access protocols. This may be achieved with a WWAN network interface 402 that supports a wireless access protocol for a WWAN to the Internet 102, and a WLAN network interface 404 that provides a wireless access point for mobile clients 108. By way of example, the WWAN network interface 402 may include a transceiver function that supports EV-DO for Internet access through a WWAN, and the WLAN network interface 404 may include a transceiver function that provides an 802.11 access point for mobile clients 108. More generally, each of the WWAN and WLAN network interfaces 402, 404 may be configured to implement the physical layer by providing the means to transmit raw data bits in accordance with the physical and electrical specifications required to interface to its respective transmission medium. Each of the WWAN and WLAN network interfaces 402, 404 may also be configured to implement the lower portion of the data link layer by managing access to its respective transmission medium.

The ad-hoc service provider 106 is shown with a filtered interconnection and session monitoring module 406. The module 406 provides filtered processing of content from mobile clients 108 so that the interconnection between the ad-hoc wireless links to the WWAN interface 402 is provided only to mobile clients 108 authenticated and permitted by the server to use the WWAN network. The module 406 also maintains tunneled connectivity between the server and the authenticated mobile clients 108.

The ad-hoc service provider 106 also includes a service provider application 408 that (1) enables the module 406 to provide ad-hoc services to mobile clients 108, and (2) supports WWAN or Internet access to a mobile subscriber or user of the ad-hoc service provider 106. The latter function is supported by a user interface 412 that communicates with the WWAN interface 402 through the module 406 under control of the service provider application 408.

As discussed above, the service provider application 408 enables the module 406 to provide ad-hoc services to mobile clients 108. The service provider application 408 maintains a session with the server to exchange custom messages with the server. In addition, the service provider application 408 also maintains a separate session with each mobile client 108 for exchanging custom messages between the service provider application 408 and the mobile client 108. The service provider application 408 provides information on authenticated and permitted clients to the filtered interconnection and session monitoring module 406. The filtered interconnection and session monitoring module 408 allows content flow for only authenticated and permitted mobile clients 108. The filtered interconnection and session monitoring module 406 also optionally monitors information regarding content flow related to mobile clients 108 such as the amount of content outbound from the mobile clients and inbound to the mobile clients, and regarding WWAN and WLAN network resource utilization and available bandwidths on the wireless channels. The filtered interconnection and session monitoring module 406 can additionally and optionally provide such information to the service provider application 408. The service provider application 408 can optionally act on such information and take appropriate actions such as determining whether to continue maintaining connectivity with the mobile clients 108 and with the server, or whether to continue to provide service. It should be noted that the functions described in modules 406 and 408 can be implemented in any given platform in one or multiple sets of modules that coordinate to provide such functionality at the ad-hoc service provider 106.

When the ad-hoc service provider 106 decides to provide these services, the service provider application 408 sends a request to the server for approval. The service provider application 408 requests authentication by the server and approval from the server to provide service to one or more mobile clients 108. The server may authenticate the ad-hoc service provider 106 and then determine whether it will grant the ad-hoc service provider's request. As discussed earlier, the request may be denied if the number of ad-hoc service providers in the same geographic location is too great or if the WWAN operator has imposed certain constraints on the ad-hoc service provider 106.

Once the ad-hoc service provider 106 is authenticated, the service provider application 408 may advertise an ad-hoc WLAN Service Set Identifier (SSID). Interested mobile clients 108 may associate with the SSID to access the ad-hoc service provider 106. The service provider application 408 may then authenticate the mobile clients 108 with the server and then configure the filtered interconnection and session monitoring module 406 to connect the mobile clients 108 to the server. During the authentication of a mobile client 108, the service provider application 408 may use an unsecured wireless link.

The service provider application 408 may optionally choose to move a mobile client 108 to a new SSID with a secure link once the mobile client 108 is authenticated. In such situations, the service provider application 408 may distribute the time it spends in each SSID depending on the load that it has to support for existing sessions with mobile clients 108.

The service provider application 408 may also be able to determine whether it can support a mobile client 108 before allowing the mobile client 108 to access a network. Resource intelligence that estimates the drain on the battery power and other processing resources that would occur by accepting a mobile client 108 may assist in determining whether the service provider application 408 should consider supporting a new mobile client 108 or accepting a handoff of that mobile client 108 from another ad-hoc service provider.

The service provider application 408 may admit mobile clients 108 and provide them with a certain QoS guarantee, such as an expected average bandwidth during a session. Average throughputs provided to each mobile client 108 over a time window may be monitored. The service provider application 408 may monitor the throughputs for all flows going through it to ensure that resource utilization by the mobile clients 108 is below a certain threshold, and that it is meeting the QoS requirement that it has agreed to provide to the mobile clients 108 during the establishment of the session.

The service provider application 408 may also provide a certain level of security to the wireless access point by routing content through the filtered interconnection and session monitoring module 406 without being able to decipher the content. Similarly, the service provider application 408 may be configured to ensure content routed between the user interface 410 and the WWAN 104 via the module 406 cannot be deciphered by mobile clients 108. The service provider application 408 may use any suitable encryption technology to implement this functionality.

The service provider application 408 may also maintain a time period for a mobile client 108 to access a network. The time period may be agreed upon between the service provider application 408 and the mobile client 108 during the initiation of the session. If the service provider application 408 determines that it is unable to provide the mobile client 108 with access to the network for the agreed upon time period, then it may notify both the server and the mobile client 108 regarding its unavailability. This may occur due to energy constraints (e.g., a low battery), or other unforeseen events. The server may then consider a handoff of the mobile client to another ad-hoc service provider, if there is such an ad-hoc service provider in the vicinity of the mobile client 108. The service provider application 408 may support the handoff of the mobile client 108.

The service provider application 408 may also dedicate processing resources to maintain a wireless link or limited session with mobile clients 108 served by other ad-hoc service providers. This may facilitate the handoff of mobile clients 108 to the ad-hoc service provider 106.

The service provider application 408 may manage the mobile client 108 generally, and the session specifically, through the user interface 412. Alternatively, the service provider application 408 may support a seamless operation mode with processing resources being dedicated to servicing mobile clients 108. In this way, the mobile client 108 is managed in a way that is transparent to the mobile subscriber. The seamless operation mode may be desired where the mobile subscriber does not want to be managing mobile clients 108, but would like to continue generating revenue by sharing bandwidth with mobile clients 108.

In at least one configuration of an ad-hoc service provider, a processing system may be used to implement the filtered interconnection and session monitoring module 406, the service provider application 408, and the service provider user interface 412. The WWAN interface 402 and WLAN interface 404 may be separate from the processing system as shown in FIG. 4, or alternatively, may be integrated, either in part or whole, into the processing system.

Figure 5:
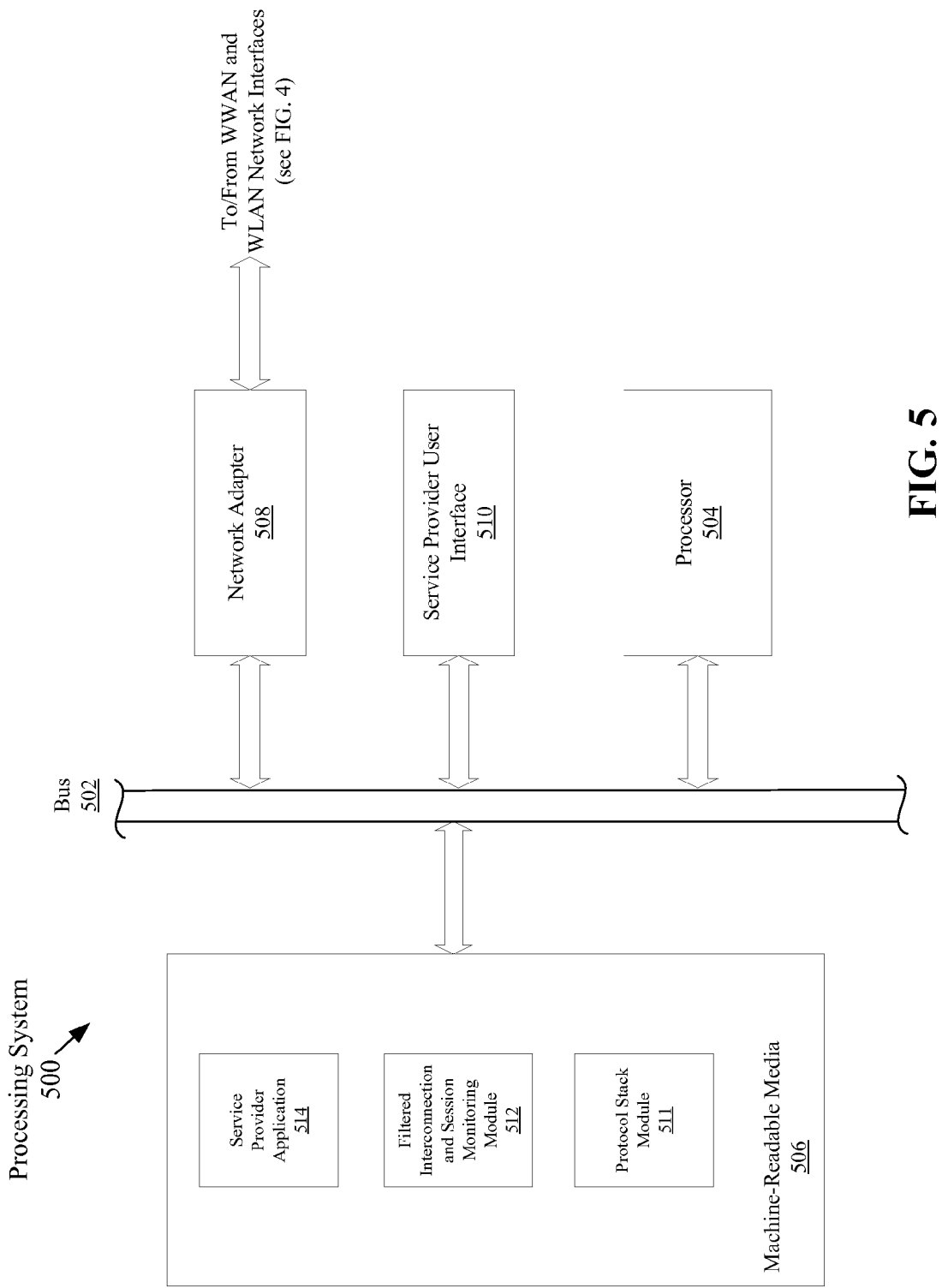
FIG. 5 is a simplified block diagram illustrating an example of a hardware configuration for a processing system in an ad-hoc service provider.

FIG. 5 is a simplified diagram illustrating an example of a hardware configuration for a processing system in an ad-hoc service provider. In this example, the processing system 500 may be implemented with a bus architecture represented generally by bus 502. The bus 502 may include any number of interconnecting buses and bridges depending on the specific application of the processing system 500 and the overall design constraints. The bus links together various circuits including a processor 504, machine-readable media 506, and a service provider user interface 510. The bus 502 may also link various other circuits such as timing sources, peripherals, voltage regulators, power management circuits, and the like, which are well known in the art, and therefore, will not be described any further. A network adapter 508 provides an interface between the WWAN and WLAN network interfaces 402, 404 (see FIG. 4) and the bus 502.

The processor 504 is responsible for managing the bus and general processing, including the execution of software stored on the machine-readable media 506. The processor 304 may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof.

In the hardware implementation illustrated in FIG. 5, the machine-readable media 506 is shown as part of the processing system 500 separate from the processor 504. However, as those skilled in the art will readily appreciate, the machine-readable media 506, or any portion thereof, may be external to the processing system 504. By way of example, the machine-readable media 506 may include a transmission line, a carrier wave modulated by data, and/or a computer product separate from the ad-hoc service provider, all which may be accessed by the processor 504 through the network interface 508. Alternatively, or in addition to, the machine readable media 306, or any portion thereof, may be integrated into the processor 504, such as the case may be with cache and/or general register files.

The processing system 504 may be configured as a general-purpose processing system with one or more microprocessors providing the processor functionality and external memory providing at least a portion of the machine-readable media 306, all linked together with other supporting circuitry through an external bus architecture. Alternatively, the processing system 504 may be implemented with an ASIC (Application Specific Integrated Circuit) with the processor 504, the network interface 508, the service provider user interface 510, supporting circuitry (not shown), and at least a portion of the machine-readable media 506 integrated into a single chip, or with one or more FPGAs (Field Programmable Gate Array), PLDs (Programmable Logic Device), controllers, state machines, gated logic, discrete hardware components, or any other suitable circuitry, or any combination of circuits that can perform the various functionality described throughout this disclosure. Those skilled in the art will recognize how best to implement the described functionality for the processing system 500 depending on the particular application and the overall design constraints imposed on the overall system.

The machine-readable media 506 is shown with a number of software modules. The software modules include instructions that when executed by the processor 504 cause the processing system to perform various functions. Each software module may reside in a single storage device or distributed across multiple memory devices. By way of example, a software module may be loaded into RAM from a hard drive when a triggering event occurs. During execution of the software module, the processor 504 may load some of the instructions into cache to increase access speed. One or more cache lines may then be loaded into a general register file for execution by the processor 504. When referring to the functionality of a software module below, it will be understood that such functionality is implemented by the processor 504 when executing instructions from that software module.

A protocol stack module 511 may be used to implement the protocol architecture, or any portion thereof, for the ad-hoc service provider. In the implementation described thus far, the protocol stack module 511 is responsible for implementing several protocol layers running on top of the data link layers implemented by the WWAN and WLAN network interfaces 402, 404 (see FIG. 4). By way of example, the protocol stack module 511 may be used to implement the upper portion of the data link layer by providing flow control, acknowledgement, and error recovery. The protocol stack module 511 may also be used to implement the network layer by managing source to destination data packet transfer, as well as the transport layer by providing transparent transfer of data between end users. Although described as part of the processing system, the protocol stack module 511, or any portion thereof, may be implemented by the WWAN and WLAN network adapters 402, 404.

The machine-readable media 506 is also shown with a filtered interconnection and session monitoring module 512 and service provider application 514. These software modules, when executed by the processor 504, cause the processing system to carry out the process steps as shown and described in FIGS. 1-4 in connection with the ad-hoc service provider.

The user interface 510 may include a keypad, display, speaker, microphone, joystick, and/or any other combination user interface devices that enable a mobile subscriber or user to access the WWAN or the Internet 102.

Turning now to the mobile client, a TLS session may be used by the mobile client 108 to register with the server 110. Once registered, the mobile client 108 may search for available ad-hoc service providers 106. When the mobile client 108 detects the presence of one or more ad-hoc service providers 106, it may initiate a session using EAP-TTLS with an ad-hoc service provider 106 based on parameters such as the available bandwidth that the ad-hoc service provider 106 can support, the QoS metric of the ad-hoc service provider 106, and the cost of the service advertised. As described earlier, a link encryption key may be established between the mobile client 108 and the ad-hoc service provider 106 during the establishment of the session. An SSL VPN session may be established between the mobile client 108 and the server 110 so that all traffic between the two is encrypted. The transport layer ports may be kept in the open and not encrypted to provide visibility for the network address translation functionality at the ad-hoc service provider 106.

The handoff of the mobile client 108 may be performed in a variety of ways. In one configuration, the mobile client 108 may maintain a limited session with multiple ad-hoc service providers 106, while using one ad-hoc service provider 106 to access the Internet. As described earlier, this approach may facilitate the handoff process. In an alternative configuration, the mobile client 108 may consider a handoff only when necessary. In this configuration, the mobile client 108 may maintain an active list of ad-hoc service providers 106 in its vicinity for handoff. The mobile client 108 may select an ad-hoc service provider 106 for handoff from the active list when the current ad-hoc service provider 106 needs to discontinue its service. When handoff is not possible, a mobile client 108 may need to reconnect through a different ad-hoc service provider 106 to access the Internet. Persistence of the tunnel between the mobile client and the server can enable a soft handoff of a mobile client from one service provider to another service provider.

If the bandwidth needs of a mobile client 108 are greater than the capabilities of the available ad-hoc service providers 106, then the mobile client 108 may access multiple ad-hoc service providers 106 simultaneously. A mobile client 108 with multiple transceivers could potentially access multiple ad-hoc service providers 106 simultaneously using a different transceiver for each ad-hoc service provider 106. If the same wireless access protocol can be used to access multiple ad-hoc service providers 106, then different channels may be used. If the mobile client 108 has only one transceiver available, then it may distribute the time that it spends accessing each ad-hoc service provider 106.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A mobile ad-hoc service provider, comprising:
a processing system comprising a processor, the processing system being configured to support pre-authentication of the mobile ad-hoc service provider with a server using information received at the server via a tunnel through another ad-hoc service provider, the pre-authentication for the purpose of receiving a handoff of a mobile client from the another ad-hoc service provider, the processing system being further configured to enable the mobile client to maintain a session with the server while receiving the handoff from said another ad-hoc service provider, the processing system being configured to maintain a wireless link between the another ad-hoc service provider and the ad-hoc service provider for receiving data packets routed to the another ad-hoc service provider for the mobile client during the handoff, the processing system being configured to establish a connection with the mobile client to receive the handoff in response to receiving a message encrypted with a key from the mobile client.

2. The mobile ad-hoc service provider of claim 1 wherein the processing system is further configured to support the pre-authentication by receiving the key from the server to support an encrypted link between the mobile ad-hoc service provider and the mobile client.

3. The mobile ad-hoc service provider of claim 1 wherein the processing system is further configured to support the pre-authentication by receiving authorization from the server to communicate with the mobile client.

4. The mobile ad-hoc service provider of claim 1 wherein the processing system is further configured to support the pre-authentication by receiving a key from the server to support an encrypted link between the mobile ad-hoc service provider and said another ad-hoc service provider.

5. The mobile ad-hoc service provider of claim 1 wherein the processing system is further configured to support the pre-authentication by receiving authorization from the server to communicate with said another ad-hoc service provider.

6. The mobile ad-hoc service provider of claim 1 wherein the processing system is further configured to enable the mobile client to maintain the session with the server while receiving the handoff by supporting the tunnel with said another ad-hoc service provider.

7. The mobile ad-hoc service provider of claim 6 wherein the processing system is further configured to receive through the tunnel at least some packets received by said another ad-hoc service provider from the mobile client.

8. The mobile ad-hoc service provider of claim 1 wherein the processing system is further configured to receive one or more of said at least some packets from said another ad-hoc service provider through yet another ad-hoc service provider.

9. The mobile ad-hoc service provider of claim 1 wherein the processing system is further configured to provide an IPv4 or IPv6 address to the mobile client.

10. The mobile ad-hoc service provider of claim 9 wherein the IPv4 or IPv6 address comprises a MobileIP address.

11. The mobile ad-hoc service provider of claim 1 wherein the processing system is further configured to receive from the server a message to receive the handoff of the mobile client from said another ad-hoc service provider.

12. The mobile ad-hoc service provider of claim 1 wherein the processing system is further configured to support a hard handoff.

13. The mobile ad-hoc service provider of claim 1 wherein the processing system is further configured to support a soft handoff.

14. The mobile ad-hoc service provider of claim 1 wherein the processing system is further configured to send a message to the server indicating that the handoff is complete.

15. A method of receiving a handoff at a mobile ad-hoc service provider, comprising:
supporting pre-authentication between the mobile ad-hoc service provider and a server using information received at the server via a tunnel through another ad-hoc service provider, the pre-authentication for the purpose of receiving a handoff of a mobile client from the another ad-hoc service provider;
establishing a connection with the mobile client to receive the handoff in response to receiving a message encrypted with a key from the mobile client;
enabling the mobile client to maintain a session with the server while receiving the handoff from said another ad-hoc service provider; and
maintaining a wireless link between the another ad-hoc service provider and the ad-hoc service provider for receiving data packets routed to the another ad-hoc service provider for the mobile client during the handoff.

16. The method of claim 15 wherein the pre-authentication is supported by receiving the key from the server to support an encrypted link between the mobile ad-hoc service provider and the mobile client.

17. The method of claim 15 wherein the pre-authentication is supported by receiving authorization from the server to communicate with the mobile client.

18. The method of claim 15 wherein the pre-authentication is supported by receiving a key from the server to support an encrypted link between the mobile ad-hoc service provider and said another ad-hoc service provider.

19. The method of claim 15 wherein the pre-authentication is supported by receiving authorization from the server to communicate with said another ad-hoc service provider.

20. The method of claim 15 wherein the mobile client is enabled to maintain the session with the server while receiving the handoff by supporting the tunnel with said another ad-hoc service provider.

21. The method of claim 20 further comprising receiving through the tunnel at least some packets received by said another ad-hoc service provider from the mobile client.

22. The method of claim 15 wherein one or more of said at least some packets received from said another ad-hoc service provider are received through yet another ad-hoc service provider.

23. The method of claim 15 further comprising providing an IPv4 or IPv6 address to the mobile client.

24. The method of claim 15 wherein the IPv4 or IPv6 address comprises a MobileIP address.

25. The method of claim 15 further comprising receiving from the server a message to receive the handoff of the mobile client from said another ad-hoc service provider.

26. The method of claim 15 wherein the handoff comprises a hard handoff.

27. The method of claim 15 wherein the handoff comprises a soft handoff.

28. The method of claim 15 further comprising sending a message to the server indicating that the handoff is complete.

29. A mobile ad-hoc service provider, comprising:
means for supporting pre-authentication between the mobile ad-hoc service provider and a server using information received at the server via a tunnel through another ad hoc service provider, the pre-authentication for the purpose of receiving a handoff of a mobile client from the another ad-hoc service provider;
means for establishing a connection with the mobile client to receive the handoff in response to receiving a message encrypted with a key from the mobile client;
means for enabling the mobile client to maintain a session with the server while receiving the handoff from said another ad-hoc service provider; and
means for maintaining a wireless link between the another ad-hoc service provider and the ad-hoc service provider for receiving data packets routed to the another ad-hoc service provider for the mobile client during the handoff.

30. The mobile ad-hoc service provider of claim 29 further comprising means for receiving through the tunnel at least some packets received by said another ad-hoc service provider from the mobile client.

31. The mobile ad-hoc service provider of claim 29 wherein the means for receiving at least some packets is configured to receive one or more of said at least some packets received from said another ad-hoc service provider through yet another ad-hoc service provider.

32. The mobile ad-hoc service provider of claim 29 further comprising means for providing an IPv4 or IPv6 address to the mobile client.

33. The mobile ad-hoc service provider of claim 32 wherein the IPv4 or IPv6 address comprises a MobileIP address.

34. The mobile ad-hoc service provider of claim 29 further comprising means for receiving from the server a message to receive the handoff of the mobile client from said another ad-hoc service provider.

35. The mobile ad-hoc service provider of claim 29 further comprising means for receiving a hard handoff.

36. The mobile ad-hoc service provider of claim 29 further comprising means for receiving a soft handoff.

37. The mobile ad-hoc service provider of claim 29 further comprising means for sending a message to the server indicating that the handoff is complete.

38. A non-transitory machine-readable medium comprising instructions executable by a processing system in a mobile ad-hoc service provider, the instructions comprising code for:
supporting pre-authentication between the mobile ad-hoc service provider and a server using information received at the server via a tunnel through another ad hoc service provider, the pre-authentication for the purpose of receiving a handoff of a mobile client from the another ad-hoc service provider;
establishing a connection with the mobile client to receive the handoff in response to receiving a message encrypted with a key from the mobile client;
enabling the mobile client to maintain a session with the server while receiving the handoff from said another ad-hoc service provider; and
maintaining a wireless link between the another ad-hoc service provider and the ad-hoc service provider for receiving data packets routed to the another ad-hoc service provider for the mobile client during the handoff.

39. The non-transitory machine-readable medium of claim 38 wherein the code for supporting pre-authentication comprises code for receiving the key from the server to support an encrypted link between the mobile ad-hoc service provider and the mobile client.

40. The non-transitory machine-readable medium of claim 39 wherein the code for supporting pre-authentication comprises code for receiving authorization from the server to communicate with the mobile client.

41. The non-transitory machine-readable medium of claim 38 wherein the code for supporting pre-authentication comprises code for receiving a key from the server to support an encrypted link between the mobile ad-hoc service provider and said another ad-hoc service provider.

42. The non-transitory machine-readable medium of claim 38 wherein the code for supporting pre-authentication comprises code for receiving authorization from the server to communicate with said another ad-hoc service provider.

43. The non-transitory machine-readable medium of claim 38 wherein the code for enabling the mobile client to maintain the session with the server while receiving the handoff comprises code for supporting the tunnel with said another ad-hoc service provider.

44. The non-transitory machine-readable medium of claim 43 wherein the instructions further comprise code for receiving through the tunnel at least some packets received by said another ad-hoc service provider from the mobile client.

45. The non-transitory machine-readable medium of claim 38 wherein the code for receiving at least some packets is configured to receive one or more of said at least some packets received from said another ad-hoc service provider through yet another ad-hoc service provider.

46. The non-transitory machine-readable medium of claim 38 wherein the instructions further comprise code for providing an IPv4 or IPv6 address to the mobile client.

47. The non-transitory machine-readable medium of claim 46 wherein the IPv4 or IPv6 address comprises a MobileIP address.

48. The non-transitory machine-readable medium of claim 38 wherein the instructions further comprise code for receiving from the server a message to receive the handoff of the mobile client from said another ad-hoc service provider.

49. The non-transitory machine-readable medium of claim 38 wherein the instructions further comprise code for receiving a hard handoff.

50. The non-transitory machine-readable medium of claim 38 wherein the instructions further comprise code for receiving a soft handoff.

51. The non-transitory machine-readable medium of claim 38 wherein the instructions further comprise code for sending a message to the server indicating that the handoff is complete.

* * * * *